United States Patent Office 3,038,947
Patented June 12, 1962

3,038,947
PROCESS FOR PREPARING POLYFLUORO-
ALKYL HALIDES
Eugene C. Coyner, Kenneth T. Dishart, and Christian S. Rondestvedt, Jr., Wilmington, Del., assignors to E. I. du Pont de Nemours and Company, Wilmington, Del., a corporation of Delaware
No Drawing. Filed Oct. 12, 1960, Ser. No. 62,096
18 Claims. (Cl. 260—653.8)

This invention relates to a novel process for preparing polyfluoroalkyl halides and particularly to preparing polyfluoroalkyl chlorides and bromides of the structure $R_fCH_2Cl$ and $R_fCH_2Br$ from polyfluoroalcohols of the structure $R_fCH_2OH$.

In the polyfluoroalkyl halides, $R_fCH_2Cl$ and $R_fCH_2Br$, $R_f$ is a polyfluoroalkyl group which contains at the most two hydrogen atoms and is represented by the formulas $C_nF_{2n+1}CF_2$—,

$C_nF_{2n+1}CF_2CHFCF_2$—, $H(CF_2)_nCF_2$—, $Cl(CF_2)_nCF_2$—, $Cl(CF_2CFCl)_mCF_2$—, and $Cl(CF_2CFCl)_mCF_2CHFCF_2$— wherein $n$ is an integer of from 1 to 23 and $m$ is an integer of from 1 to 12.

Representative members of the polyfluoroalkyl halides of this invention are well known to the art and to be useful for a wide variety of purposes. Particularly, there polyfluoroalkyl halides are thermally stable and resist hydrolysis, and are useful as stable solvents, heat exchange media, hydraulic fluids, dielectrics and fire extinguishing agents, including selective solvents for oils and greases in the cleaning of electronic equipment and precision instruments and as a solvent media for the polymerization of perfluoroolefins, such as tetrafluoroethylene. Two members of the group $H(CF_2)_2CH_2Cl$ and $H(CF_2)_2CH_2Br$, are known to be efficient and useful inhalation anesthetics. These two compounds and some of their uses are described and claimed in the copending application of Werner V. Cohen, Serial No. 4593, filed January 26, 1960. Other products, $R_fCH_2Cl$ and $R_fCH_2Br$, have been described previously. Faurote et al. (J. Am. Chem. Soc., 78, 4999 (1956)) have described $H(CF_2)_6CH_2Cl$ and $H(CF_2)_6CH_2Br$; McBee et al. have described $CF_3CF_2CH_2Cl$, $CF_3CF_2CH_2Br$ and $CF_3(CF_2)_2CH_2Cl$ (J. Am. Chem. Soc., 77, 3149 (1955)); Krogh et al. have described $CF_3(CF_2)_2CH_2Br$ (J. Org. Chem., 19, 1124 (1954)) and Tiers et al. have described $CF_3(CF_2)_4CH_2Cl$ (J. Am. Chem. Soc., 75, 5978 (1953)).

A good synthetic route to the chlorides, $R_fCH_2Cl$, and the bromides, $R_fCH_2Br$, depends on a good source of starting materials. It also requires that the products be as inexpensive as possible and readily purified. A readily available series of starting materials are the polyfluoroalcohols, $R_fCH_2OH$. Presently known methods for converting these polyfluoroalcohols to the chlorides and bromides involve two steps, (a) conversion of the polyfluoroalcohol to an ester of structure $R_fCH_2O_3S$—A wherein A is an aromatic group (e.g. tolyl), chlorine or another polyfluoroalcohol group $R_fCH_2O$—, and (b) reaction of the ester with an inorganic halide, usually an alkali metal halide, in a high boiling solvent, such as ethylene glycol or diethylene glycol, at or near the reflux temperature (see for example Faurote et al., loc. cit., and Cohen, loc. cit.). The over-all yield of chloride or bromide from the polyfluoroalcohol by the two-step process frequently is quite low.

The two-step process for converting these polyfluoroalcohols to the corresponding chlorides and bromides is used because ordinary methods do not effect the desired conversion. Hydrocarbon alcohols are readily converted to the corresponding chlorides and bromides (excepting special cases which undergo unusual reactions) by treating with a number of reagents. Well known examples are treatment of the hydrocarbon alcohol with hydrochloric acid or hydrobromic acid in the presence of a zinc halide, treatment with a phosphorus halide, or treatment with the free halogen in the presence of phosphorus. The polyfluoroalcohols, $R_fCH_2OH$, are not converted to the polyfluoroalkyl halides, $R_fCH_2X$, by any of these reagents (see Krogh et al., loc. cit.; Husted and Ahlbrecht, U.S. Patent 2,666,797). It is well known that there is a fundamental difference in reactivity between the hydrocarbon alcohols and the polyfluoroalcohols, e.g., polyfluoroalcohols do not react with sulfuric acid to form ethers as do the hydrocarbon alcohols (Husted et al., loc. cit.). The observed lack of reactivity of the polyfluoroalcohols is apparently due to the carbon-oxygen bond of the polyfluoroalcohols being much stronger than in the hydrocarbon alcohols, rendering the polyfluoroalcohols immune to many reactions which involve breaking the carbon-oxygen bond.

It is an object of this invention to provide a novel process for preparing polyfluoroalkyl halides of the structure $R_fCH_2Cl$ and $R_fCH_2Br$ wherein $R_f$ has the structure hereinbefore defined. Another object is to provide such a process wherein such polyfluoroalkyl halides are obtained by a single step from the corresponding polyfluoroalcohols of the structure $R_fCH_2OH$. A further object is to provide a process for preparing such polyfluoroalkyl halides in high yields by a simple and economical process. Other objects are to advance the art. Still other objects will appear hereinafter.

The above and other objects may be accomplished in accord with this invention which comprises the process for preparing polyfluoroalkyl halides by reacting one mole of a polyfluoroalcohol having a formula of the group consisting of $C_nF_{2n+1}CF_2CH_2OH$,

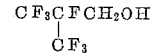

$C_nF_{2n+1}CF_2CHFCF_2CH_2OH$, $H(CF_2)_nCF_2CH_2OH$, $Cl(CF_2)_nCF_2CH_2OH$, $Cl(CF_2CFCl)_mCF_2CH_2OH$ and $Cl(CF_2CFCl)_mCF_2CHFCF_2CH_2OH$ wherein $n$ is an integer of from 1 to 23 and $m$ is an integer of from 1 to 12, with from about 1.1 to about 2.5 moles of a thionyl halide in which the halogen has an atomic number of from 17 to 35 and from about 0.01 to about 1 mole of an amide of the formula

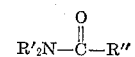

wherein $R'_2N$— represents the radical of a saturated secondary monoamine containing 2 to 16 carbon atoms and consisting of carbon, hydrogen and the single nitrogen atom, and $R''$ represents a member of the group consisting of hydrogen, an alkyl group of 1 to 8 carbon atoms, phenyl, halophenyl, and alkyl-substituted phenyl in which the alkyl groups contain 1 to 4 carbon atoms, at a temperature of from about 50° C. to about 200° C., and recovering the polyfluoroalkyl halide from the reaction mixture.

Preferably, the polyfluoroalcohol is gradually added to a mixture initially consisting essentially of the thionyl halide and the amide in the specified proportions. The process may be carried out batchwise or as a continuous process.

Mole ratio, as herein used, is the ratio of the number of moles of indicated material initially present to the number of moles of polyfluoroalcohol used, e.g., the mole ratio of catalyst=(moles catalyst)/(moles polyfluoroalcohol).

It has been found that, when the polyfluoroalcohols of the defined class are treated by such process, the hydroxyl group of the polyfluoroalcohol is replaced by the halogen of the thionyl halide by a single step process. In the light of the prior teachings that the polyfluoroalcohols of the type $R_fCH_2OH$ do not undergo reactions which directly replace the hydroxyl group by a halogen, it was unexpected that the hydroxyl group would be replaced by treatment with a thionyl halide, and particularly that amides would act as catalysts to cause such reaction to take place. To applicants' knowledge, this is the first known case wherein such a replacement of the hydroxyl group in polyfluoroalcohols of the formula $R_fCH_2OH$ has been accomplished in a single step process.

The alcohols, which are known to be useful in the present invention, are those of the structures $C_nF_{2n+1}CF_2CH_2OH$, $$CF_3CFCH_2OH$$
$$|$$
$$CF_3$$

$C_nF_{2n+1}CF_2CHFCF_2CH_2OH$, $H(CF_2)_nCF_2CH_2OH$, $Cl(CF_2)_nCF_2CH_2OH$, $Cl(CF_2CFCl)_mCF_2CH_2OH$ and $Cl(CF_2CFCl)_mCF_2CHFCF_2CH_2OH$, wherein $n$ represents an integer from 1 to 23 and $m$ represents an integer from 1 to 12. The preferred alcohols are those which contain a total of from 3 to 9 carbon atoms. Examples are:

1H,1H-perfluoro-1-propanol, $n$-$C_2F_5CH_2OH$
1H,1H-perfluoro-1-butanol, $n$-$C_3F_7CH_2OH$
1H,1H-perfluoroisobutanol, $(CF_3)_2CFCH_2OH$
1H,1H-perfluoro-1-hexanol, $n$-$C_5F_{11}CH_2OH$
1H,1H-perfluoro-1-octanol, $n$-$C_7F_{15}CH_2OH$
1H,1H-perfluoro-1-decanol, $n$-$C_9F_{17}CH_2OH$
1H,1H-perfluoro-1-dodecanol, $n$-$C_{11}F_{23}CH_2OH$
1H,1H-perfluoro-1-eicosanol, $n$-$C_{19}F_{37}CH_2OH$
1H,1H,3H-perfluoro-1-propanol, $HCF_2CF_2CH_2OH$
1H,1H,5H-perfluoro-1-pentanol, $H(CF_2CF_2)_2CH_2OH$
1H,1H,7H-perfluoro-1-heptanol, $H(CF_2CF_2)_3CH_2OH$
1H,1H,9H-perfluoro-1-nonanol, $H(CF_2CF_2)_4CH_2OH$
1H,1H,11H-perfluoro-1-undecanol, $H(CF_2CF_2)_5CH_2OH$
1H,1H,13H-perfluoro-1-tridecanol, $H(CF_2CF_2)_6CH_2OH$
1H,1H,21H-perfluoro-1-henicosanol, $H(CF_2CF_2)_{10}$-$CH_2OH$
1H,1H,25H-perfluoro-1-pentacosanol, $H(CF_2CF_2)_{12}$-$CH_2OH$
3-chloro-1H,1H-perfluoro-1-propanol, $ClCF_2CF_2CH_2OH$
5-chloro-1H,1H-perfluoro-1-pentanol, $Cl(CF_2CF_2)_2$-$CH_2OH$
7-chloro-1H,1H-perfluoro-1-heptanol, $Cl(CF_2CF_2)_3$-$CH_2OH$
9-chloro-1H,1H-perfluoro-1-nonanol, $Cl(CF_2CF_2)_4$-$CH_2OH$
11-chloro-1H,1H-perfluoro-1-undecanol, $Cl(CF_2CF_2)_5$-$CH_2OH$
13-chloro-1H,1H-perfluoro-1-tridecanol, $Cl(CF_2CF_2)_6$-$CH_2OH$
17-chloro-1H,1H-perfluoro-1-heptadecanol, $Cl(CF_2CF_2)_8$-$CH_2OH$
21-chloro-1H,1H-perfluoro-1-henicosanol, $Cl(CF_2CF_2)_{10}$-$CH_2OH$
1H,1H,3H-perfluoro-1-butanol, $CF_3CHFCF_2CH_2OH$
1H,1H,3H-perfluoro-1-pentanol, $C_2F_5CHFCF_2CH_2OH$
1H,1H,3H-perfluoro-1-hexanol, $n$-$C_3F_7CHFCF_2CH_2OH$
1H,1H,3H-perfluoro-1-octanol, $n$-$C_5F_{11}CHFCF_2CH_2OH$
1H,1H,3H-perfluoro-1-decanol, $n$-$C_7F_{15}CHFCF_2CH_2OH$
$Cl(CF_2CFCl)_mCF_2CH_2OH$ wherein $m=1-12$, such as ($m=1$) 3,4-dichloro-1H,1H-perfluoro-1-butanol, and ($m=2$) 3,5,6-trichloro-1H,1H-perfluoro-1-hexanol; and $Cl(CF_2CFCl)_mCF_2CHFCF_2CH_2OH$ wherein $m=1-12$, such as ($m=1$) 5,6-dichloro-1H,1H,3H-perfluoro-1-hexanol, and ($m=2$) 5,7,8-trichloro-1H,1H,3H-perfluoro-1-octanol.

While alcohols of types $C_nF_{2n+1}CF_2CH_2OH$, $$CF_3CFCH_2OH$$
$$|$$
$$CF_3$$

$H(CF_2)_nCF_2CH_2OH$, $Cl(CF_2)_nCF_2CH_2OH$, $C_nF_{2n+1}$-$CHFCF_2CH_2OH$, $Cl(CF_2CFCl)_mCF_2CH_2OH$ and $Cl$-$(CF_2CFCl)_mCF_2CHFCF_2CH_2OH$ vary considerably in physical properties, chemical stability and the effect they and their derivatives have on other physical phenomena such as the surface tensions of solutions, they all react similarly in the present process. Any polyfluoroalcohol, possessing a group containing at least two polyfluorine-substituted carbons attached to the —$CH_2OH$ group, will be non-reactive toward direct replacement of the hydroxyl group by halogen; said groups include —$CF_2CF_2CH_2OH$, —$CFHCF_2CH_2OH$, —$CFClCF_2CH_2OH$ and $$-CF_2-CF-CH_2OH$$
$$|$$
$$CF_3$$

However, when treated by the process of this invention, the hydroxyl group of such polyfluoroalcohols is replaced by the halogen of the thionyl halide, producing the corresponding polyfluoroalkyl halide.

Representative polyfluoroalkyl halides, which may be so prepared, are:

1-chloro-1H,1H-perfluoropropane
1-chloro-1H,1H-perfluorobutane
1-chloro-1H,1H-perfluoroisobutane
1-chloro-1H,1H-perfluorohexane
1-chloro-1H,1H-perfluorooctane
1-chloro-1H,1H-perfluorodecane
1-chloro-1H,1H-perfluorododecane
1-chloro-1H,1H-perfluoroeicosane
1-chloro-1H,1H,3H-perfluoropropane
1-chloro-1H,1H,5H-perfluoropentane
1-chloro-1H,1H,7H-perfluoroheptane
1-chloro-1H,1H,9H-perfluorononane
1-chloro-1H,1H,11H-perfluoroundecane
1-chloro-1H,1H,13H-perfluorotridecane
1-chloro-1H,1H,21H-perfluorohenicosane
1-chloro-1H,1H,25H-perfluoropentacosane
1,3-dichloro-1H,1H-perfluoropropane
1,5-dichloro-1H,1H-perfluoropentane
1,7-dichloro-1H,1H-perfluoroheptane
1,9-dichloro-1H,1H-perfluorononane
1,11-dichloro-1H,1H-perfluoroundecane
1,13-dichloro-1H,1H-perfluorotridecane
1,17-dichloro-1H,1H-perfluoroheptadecane
1,21-dichloro-1H,1H-perfluorohenicosane
1-chloro-1H,1H,3H-perfluorobutane
1-chloro-1H,1H,3H-perfluoropentane
1-chloro-1H,1H,3H-perfluorohexane
1-chloro-1H,1H,3H-perfluorooctane
1-chloro-1H,1H,3H-perfluorodecane
1,3,4-trichloro-1H,1H-perfluorobutane
1,3,5,6-tetrachloro-1H,1H-perfluorohexane
1,5,6-trichloro-1H,1H,3H-perfluorohexane
1,5,7,8-tetrachloro-1H,1H,3H-perflurorooctane
and the corresponding 1-bromo compounds.

This invention is of particular value for the preparation of 1-chloro-1H,1H,3H-propane and 1-bromo-1H,1H,3H-propane from 1H,1H,3H-perfluoro-1-propanol economically and in high yields.

Polyfluoroalcohols of the type $Z(C_nF_{2n})CF_2CH_2OH$ ($Z=F$ and $Cl$) are prepared by the reduction of esters of the corresponding acids with lithium aluminum hydride (Husted et al., loc. cit.)

$$Z(C_nF_{2n})CF_2CO_2CH_3 \xrightarrow{LiAlH_4} Z(C_nF_{2n})CF_2CH_2OH + CH_3OH$$

Polyfluoroalcohols of the type $$H(CF_2)_n-CF_2-CH_2OH$$

wherein $n$ is 1, 3, 5, 7, 9, etc. are prepared by reacting tetrafluoroethylene with methanol in the presence of a free radical catalyst, $$CH_3OH + n-CF_2=CF_2 \rightarrow H(CF_2CF_2)_nCH_2OH$$

(Joyce, U.S. Patent 2,559,628), and the polyfluoroalcohols of this class are more preferred, particularly those wherein $n$ is an integer of from 1 to 4, i.e., those which contain a total of from 3 to 9 carbon atoms. Polyfluoroalcohols of the type $$F(C_nF_{2n})CHFCF_2CH_2OH$$

and $$Cl(CF_2CFCl)_nCF_2CHFCF_2CH_2OH$$

are prepared by reacting the polyfluoroolefins $$F(C_nF_{2n})CF{=}CF_2$$

and $$Cl(CF_2CFCl)_nCF_2CF{=}CF_2$$

with methanol in the presence of a free radical catalyst (LaZerte et al., J. Am. Chem. Soc., 77, 910 (1955); Wujciak et al., U.S. Patent 2,824,897). The polyfluoroolefins $$F(C_nF_{2n})CF{=}CF_2$$

and $$Cl(CF_2CFCl)_nCF_2CF{=}CF_2$$

are prepared bw pyrolysis of the sodium salts $$F(C_nF_{2n})CF_2CF_2CO_2Na$$

and $$Cl(CF_2CFCl)_nCF_2CFClCF_2CO_2Na$$

(Hals et al., J. Chem. Soc., 73, 4054 (1951); U.S. Patent 2,668,864; Brice et al., J. Am. Chem. Soc. 75, 2698 1953); Haszeldine et al., J. Chem. Soc., 1952, 4259, 1955, 3880; LaZerte et al., J. Am. Chem. Soc., 75, 4525 (1953); Wujciak, loc. cit.). Polyfluoroalcohols of the type, $Cl(CF_2CFCl)_nCF_2CH_2OH$, are prepared by reaction of the polyfluoroalkyl esters, $Cl(CF_2CFCl)_nCF_2CO_2R$, in a manner analogous to the preparation of $$Z(C_nF_{2n})CF_2CH_2OH$$

(Wujciak, loc. cit.).

Certain special syntheses for polyfluoroalcohols also exist, e.g., the reaction of $CF_2{=}CF_2$ and $CF_3CF{=}CF_2$ with formaldehyde in hydrogen fluoride to give $$CF_3CF_2CH_2OH$$

and $$(CF_3)_2CFCH_2OH$$

as described by Viktor Weinmayr in his copending applications Serial No. 814,386 and Serial No. 814,415, both filed May 20, 1959 and now U.S. Patent Nos. 2,999,884 and 2,992,276, respectively.

The thionyl halides which may be employed in the process of this invention are those in which the halogen has atomic number of from 17 to 35, i.e., chlorine and bromine. The thionyl halides have the formula $SOX_2$ wherein X represents a halogen. While both thionyl chloride and thionyl bromide are useful, the results obtained with thionyl chloride are particularly outstanding and it is preferred.

To obtain high yields of the desired products in the present process, at least 1.1 moles of thionyl halide should be present for each mole of starting polyfluoroalcohol and preferably two moles of thionyl halide should be present. A side reaction apparently occurs when less than two moles of thionyl halide are used, leading to the formation of the sulfite ester $(R_fCH_2O)_2SO$. The process appears to involve the two reactions shown below:

(1) $\quad R_fCH_2OH + SOX_2 \rightarrow R_fCH_2O{-}SOX + HX$ (2)

$$R_fCH_2OSOX \xrightarrow[SOX_2, \text{ heat}]{R''\overset{O}{\overset{\|}{C}}NR'_2} R_fCH_2X + SO_2$$

When insufficient thionyl halide is present, the intermediate halosulfite ester, from reaction 1, reacts with more polyfluoroalcohol to form the ester, i.e., reaction 3.

(3) $\quad R_fCH_2OSOX + R_fCH_2OH \rightarrow [R_fCH_2O]_2SO + HX$

The two moles of thionyl halide are preferred, therefore, to rapidly convert all of the polyfluoroalcohol to the halosulfite before the halosulfite can react with further amounts of polyfluoroalcohol. This is particularly true near the end of the polyfluoroalcohol addition when a large portion of the first mole of thionyl halide has been consumed. While any amount of thionyl halide greater than about 2.5 moles per mole of polyfluoroalcohol may be used, a greater excess serves no useful purpose.

The formation of the sulfite ester points out a further distinction between the polyfluoroalcohols of this invention and the hydrocarbon alcohols. The intermediate chlorosulfite formed from hydrocarbon alcohols is very unstable, particularly if a weak base is present, and decomposes very rapidly to the corresponding alkyl halide and sulfur dioxide before it can react with another molecule of alcohol. The greater carbon-oxygen bond strength of the polyfluoroalcohols stabilizes the intermediate chlorosulfite to the extent that it can react with a second molecule of polyfluoroalcohol.

The amides which may be employed in the process of this invention have the formula $$R'_2N{-}\overset{O}{\overset{\|}{C}}{-}R''$$

wherein $R'_2N{-}$ represents the radical of a saturated secondary monoamine containing 2 to 16 carbon atoms and consisting of carbon, hydrogen and the single nitrogen atom, and $R''$ represents a member of the group consisting of hydrogen, an alkyl group of 1 to 8 carbon atoms, phenyl, halophenyl, and alkyl-substituted phenyl in which the alkyl groups contain 1 to 4 carbon atoms. In other words, it is essential that each $R'$ be a monovalent alkyl group or that both $R'$ represent a divalent alkyl group which forms with the nitrogen atom a heterocyclic ring. The amide cannot contain functional groups which would react with a thionyl halide. Both $R'$ groups may not be aromatic groups and neither $R'$ may be hydrogen, for the amide to be catalytically effective in this process. Also, the amide function cannot be part of a ring as in N-methylpyrrolidone, $$\begin{array}{c}(CH_2)_3{-}C{=}O\\ \phantom{(CH_2)_3{-}}|\phantom{C{=}O}\\ \phantom{(CH_2)_3{-}C}{-}NCH_3\end{array}$$

which is catalytically inactive.

When each $R'$ is a monovalent alkyl group, each alkyl group may contain 1 to 8 carbon atoms such as methyl, ethyl, propyl, butyl, amyl, hexyl, heptyl, and octyl. Where both $R'$ groups represent a divalent alkyl group, then $R'_2N{-}$ will represent the radical of a heterocyclic amine such as pyrrolidine, piperidine, and morpholine. Preferably, $R'_2N{-}$ will represent the radical of a dialkyl amine, particularly wherein each alkyl group contains from 1 to 4 carbon atoms. The $$-\overset{O}{\underset{\|}{C}}-R''$$

group represents an acyl radical and preferably a saturated aliphatic acyl radical of 1 to 9 carbon atoms which consists of carbon, hydrogen, and the single acyl oxygen atom. In other words, R″ preferably represents hydrogen or an alkyl group of 1 to 8 carbon atoms such as methyl, ethyl, propyl, butyl, amyl, heptyl, and octyl radicals. However, R″ may be phenyl, tolyl, xylyl, chlorophenyl, dichlorophenyl, chlorotolyl, and the like. The preferred amides are the dialkyl amides of the saturated aliphatic hydrocarbon monocarboxylic acids, particularly those wherein each alkyl radical contains 1 to 4 carbon atoms and the acid contains 1 to 5 carbon atoms. The most preferred catalyst is dimethylformamide.

Typical amides are:

dimethylformamide, $(CH_3)_2NCHO$
diethylformamide, $(C_2H_5)_2NCHO$
dibutylformamide, $C_4H_9)_2NCHO$
dimethylacetamide, $(CH_3)_2NCOCH_3$
diethylacetamide, $(C_2H_5)_2NCOCH_3$
dimethylpropionamide, $(CH_3)_2NCOC_2H_5$
dimethylcaprylamide, $(CH_3)_2NCOC_7H_{15}$
diethylcaprylamide, $(C_2H_5)_2NCOC_7H_{15}$
dimethyl benzamide, $(CH_3)_2NCOC_6H_5$
dimethyl toluamide, $(CH_3)_2NCOC_6H_4(CH_3)$

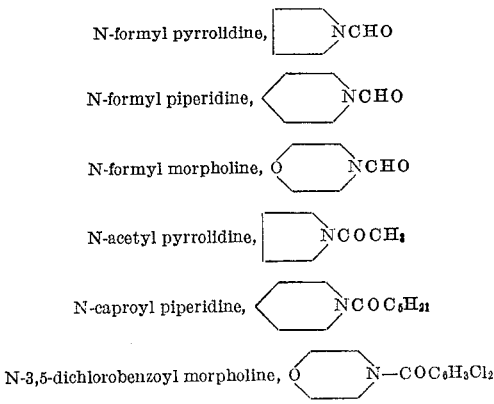

The catalysis of the reaction of polyfluoroalcohols with thionyl halides by amides of the structure $$R'_2N\overset{O}{\underset{\|}{C}}-R''$$

is unexpected. There are no reported examples of the reaction of alcohols with thionyl halides being catalyzed by amides. Weak bases, such as pyridine, have been used with hydrocarbon alcohols, but amides are not considered to be bases. Indeed, amide hydrogens are sufficiently acidic to react with alkali metals.

The quantity of amide catalyst used is also important. Use of either more or less than the optimum ratio of amide to polyfluoroalcohol causes a sharp drop in yield. No polyfluoroalkyl halide is formed when the specific amide catalysts are absent, the products being the chlorosulfite and sulfite esters. The preferred range of amide mole ratios for optimum yields is from about 0.05 to about 0.5 mole of amide per mole of polyfluoroalcohol, with about 0.2 mole being the most preferred ratio for 2,2,3,3-tetrafluoropropanol. Reaction occurs outside the preferred range but the yields are lower, e.g. when a mole ratio of 0.01 is used with $HCF_2CF_2CH_2OH$ and $(CH_3)_2NCHO$, a 30% yield results, and, when a mole ratio of 1 is used, a 25% yield results. It should be understood that the mole ratio of reactants is determined before the reaction is carried out. The mole ratio can be related to the concentrations in the reaction mixture but not accurately since the concentrations change as alcohol is added and the various products are formed. The mole ratio, depending as it does only on the relative weights of reactants, is an easily determined and controlled factor.

The process is simple and easily carried out and controlled. Preferably, the thionyl halide and the amide catalyst are added to a suitable reaction vessel and heated to the desired temperature. Then, the polyfluoroalcohol is gradually added to the vessel with stirring. The reaction is substantially complete when the addition of the polyfluoroalcohol has been completed. The reaction is carried out in the liquid phase, and superatmospheric pressures will be employed as required by the temperatures employed. Solvents are unnecessary and, in most cases, are undesirable.

The reaction mixture may be separated by a number of methods. It may be fractionally distilled and the product halide and excess thionyl halide recovered thereby. The reaction mixture may also be drowned in water and the water insoluble product collected and distilled. Other methods will occur to those skilled in the art.

The examples, tabulated in Table I, illustrate the practice of the present invention. These reactions were carried out by placing the desired amounts of the chosen thionyl halide and of the amide catalyst in a flask equipped with an efficient reflux system. The mixture was heated to from about 50° C. to about the reflux temperature of the mixture. This reflux temperature varies with the components of the mixture, but does not exceed the boiling point of thionyl bromide (about 140° C.). The desired amount of polyfluoroalcohol was added slowly to the heated mixture with stirring. Sulfur dioxide and hydrogen halide were removed through the reflux system, while any polyfluoroalcohol, thionyl halide and polyfluoroalkyl halide were returned to the reaction mixture. The efficient reflux system was used because some of the polyfluoroalkyl halides are relatively volatile and are carried off otherwise with the sulfur dioxide and the hydrogen halide.

When the polyfluoroalcohol addition was complete, the product polyfluoroalkyl halide, $R_fCH_2X(X=Cl$ or $Br)$, and any excess thionyl halide were distilled from the reaction mixture. The distillate was then treated with a water-ice mixture to decompose the excess thionyl halide, and the polyfluoroalkyl halide was separated, dried and collected. For most purposes, the products were sufficiently pure at this stage, requiring no further purification. For anesthetic use of $HCF_2CF_2CH_2Cl$ and $$HCF_2CF_2CH_2Br$$

further purification was necessary involving a combination of a highly efficient fractional distillation and an adsorption technique. This purification has been described in the copending application of Kenneth T. Dishart, Serial No. 9,455, filed February 18, 1960, and now abandoned.

The experiments, whose results are collected in Table I, illustrate the effect of reactant mole ratio and the nature of the amide on the yield of the desired product. The yield of the by-product sulfite ester, $(R_fCH_2O)_2SO$, or halosulfite ester, $R_fCH_2OSOX$, was determined by examination of the residue of the distillation described in the preceding paragraph after the polyfluoroalkyl halide and excess thionyl halide had been removed. The residue was composed of the amide catalyst and the by-product ester. The "large" in the table means that the exact amount of the sulfite ester was not determined but constituted the major proportion of the residue.

TABLE I

| Ex. No. | Alcohol | SOX₂ X= | SOX₂ Mole Ratio ᵃ | Amide R′₂NC—R″ ‖ O  R′ | Amide R″ | Amide Mole Ratio ᵃ | Products $R_f$—CH₂X  $R_f$= | Products X= | Percent Yield | $(R_f$—CH₂O$)_2$SO Percent Yield |
|---|---|---|---|---|---|---|---|---|---|---|
| 1 | HCF₂CF₂CH₂OH | Cl | 1.1 | CH₃ | H | 0.01 | H(CF₂)₂ | Cl | 44 | 32 |
| 2 | HCF₂CF₂CH₂OH | Cl | 2 | CH₃ | H | 0.01 | H(CF₂)₂ | Cl | 42 | 38 |
| 3 | HCF₂CF₂CH₂OH | Cl | 2 | CH₃ | H | 1 | H(CF₂)₂ | Cl | 25 | large |
| 4 | HCF₂CF₂CH₂OH | Cl | 2 | CH₃ | H | 0.2 | H(CF₂)₂ | Cl | ᵇ 95+ | 0 |
| 5 | HCF₂CF₂CH₂OH | Cl | 1.5 | CH₃ | H | 0.2 | H(CF₂)₂ | Cl | 58 | large |
| 6 | HCF₂CF₂CH₂OH | Cl | 1.5 | CH₃ | H | 0.5 | H(CF₂)₂ | Cl | 33 | large |
| 7 | HCF₂CF₂CH₂OH | Cl | 2 | CH₃ | H | 0.1 | H(CF₂)₂ | Cl | ᵇ 95+ | 0 |
| 8 | HCF₂CF₂CH₂OH | Cl | 2 | CH₃ | H | 0.05 | H(CF₂)₂ | Cl | ᵇ 95+ | 0 |
| 9 | HCF₂CF₂CH₂OH | Cl | 2 |  |  | 0 | H(CF₂)₂ | Cl | 0 | 0 |
| 10 | HCF₂CF₂CH₂OH | Cl | 2 | C₂H₅ | H | 0.2 | H(CF₂)₂ | Cl | 0 | ᶜ 70 |
| 11 | HCF₂CF₂CH₂OH | Cl | 2 | C₂H₅ | CH₃ | 0.2 | H(CF₂)₂ | Cl | 65 | 4.4 |
| 12 | HCF₂CF₂CH₂OH | Cl | 2 | H | C₆H₅ | 0.2 | H(CF₂)₂ | Cl | 53 | 22.6 |
| 13 | H(CF₂CF₂)₃CH₂OH | Cl | 2 | CH₃ | H | 0.2 | H(CF₂)₆ | Cl | 0 | (d) |
| 14 | H(CF₂CF₂)₄CH₂OH | Cl | 2 | CH₃ | H | 0.2 | H(CF₂)₈ | Cl | 34 | large |
| 16 | HCF₂CF₂CH₂OH | Cl | 2 | H | CH₃ | 0.2 | H(CF₂)₂ | Cl | 29 | large |
| 17 | HCF₂CF₂CH₂OH | Br | 2 | CH₃ | H | 0.2 | H(CF₂)₂ | Br | 30 | (d) |
| 18 | CF₃CF₂CH₂OH | Cl | 2 | CH₃ | H | 0.2 | C₂F₅ | Cl | ᵇ 95+ | ᵈ 70 |
| 19 | HCF₂CF₂CH₂OH | Cl | 2 | (CH₂)₃—C=O —NCH₃ |  | 0.2 | H(CF₂)₂ | Cl | 0 |  |
| 20 | CF₃(CF₂)₆CH₂OH | Cl | 2 | CH₃ | H | 0.2 | CF₃(CF₂)₆ | Cl | 66 | 33 |

ᵃ Mole ratio=No. of moles of SOX₂ or R′₂NCOR″/No. of moles of R₄CH₂OH.
ᵇ Small losses of product due to entrainment with SO₂ and HX were encountered.
ᶜ Plus 8H HCF₂CF₂CH₂OSOCl.
ᵈ Entirely R₄CH₂OSOX and (R₄CH₂O)₂SO.

Examples 9, 12, 16 and 19 are included for purposes of comparison and show that the desired reaction does not take place in the absence of the amide (Example 9) or in the presence of amides outside of the specified class, e.g. benzamide (Example 12), acetamide (Example 16), and N-methyl pyrrolidone (Example 19).

The product polyfluoroalkyl halides of the present process are liquids or solids at room temperature and pressure depending on $R_f$. They are extraordinarily stable to hydrolysis and chemical attack, including reduction. They are also reasonably stable to attack by free radicals. The boiling points at atmospheric pressure of some of these chlorides and bromides are reproduced in Table II below.

TABLE II

*Boiling Points of $R_f$CH₂X*

| $R_f$ | X | B.p. °C. | $R_f$ | X | B.p. °C. |
|---|---|---|---|---|---|
| HCF₂CF₂— | Cl | 54 | CF₃CF₂— | Br | 46 |
| HCF₂CF₂— | Br | 74 | CF₃CF₂CF₂— | Cl | 54 |
| H(CF₂CF₂)₂— | Cl | 104–105 | CF₃CF₂CF₂— | Br | 69 |
| H(CF₂CF₂)₂— | Br | 120 | CF₃(CF₂)₄— | Cl | 103.6 |
| H(CF₂CF₂)₃— | Cl | 141–143 | CF₂ClCF₂— | Cl | 67.9 |
| H(CF₂CF₂)₃— | Br | 157–159 | CF₃(CF₂)₆— | Cl | 145–155 |
| H(CF₂CF₂)₄— | Cl | 178–180 | CF₃CHF—CF₂— | Cl | ~60 |
| CF₃CF₂— | Cl | 28 |  |  |  |

It will be understood that the preceding examples have been given for illustrative purposes solely and that, subject to the limitations set forth in the general description, many variations and modifications can be made therein, particularly in the polyfluoroalcohols and the amides employed, the proportions of materials, the temperatures, and the techniques employed, without departing from the spirit or scope of this invention.

From the preceding description, it will be apparent that this invention constitutes a novel, single-step process for producing polyfluoroalkyl halides from the corresponding polyfluoroalcohols. Particularly, it provides a method for producing such halides, especially the chlorides, efficiently in high yields from readily available starting materials. The process is simple, readily controlled, and economical to operate. Accordingly, it will be apparent that this invention constitutes a valuable advance in and contribution to the art.

The embodiments of the invention in which an exclusive property or privilege is claimed are defined as follows:

1. The process for preparing polyfluoroalkyl halides which comprises reacting one mole of a polyfluoroalcohol having a formula of the group consisting of $C_nF_{2n+1}CF_2CH_2OH$

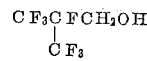

$C_nF_{2n+1}CF_2CHFCF_2CH_2OH$,  $H(CF_2)_nCF_2CH_2OH$, $Cl(CF_2)_nCF_2CH_2OH$,  $Cl(CF_2CFCl)_mCF_2CH_2OH$ and $Cl(CF_2CFCl)_mCF_2CHFCF_2CH_2OH$ wherein $n$ is an integer of from 1 to 23 and $m$ is an integer of from 1 to 12, with from about 1.1 to about 2.5 moles of a thionyl halide in which the halogen has an atomic number of from 17 to 35 in the presence of from about 0.01 to about 1 mole of an amide of the formula

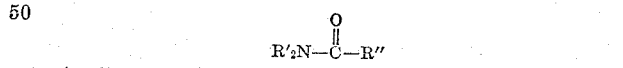

wherein R′₂N— represents the radical of a saturated secondary monoamine containing 2 to 16 carbon atoms and consisting of carbon, hydrogen and the single nitrogen atom, and R″ represents a member of the group consisting of hydrogen, an alkyl group of 1 to 8 carbon atoms, phenyl, halophenyl, and alkyl-substituted phenyl in which the alkyl groups contain 1 to 4 carbon atoms, at a temperature of from about 50° C. to about 200° C., and recovering the polyfluoroalkyl halide from the reaction mixture.

2. The process for preparing polyfluoroalkyl halides which comprises reacting one mole of a polyfluoroalcohol having a formula of the group consisting of $C_nF_{2n+1}CF_2CH_2OH$

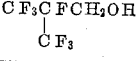

$C_nF_{2n+1}CF_2CHFCF_2CH_2OH$,  $H(CF_2)_nCF_2CH_2OH$, $Cl(CF_2)_nCF_2CH_2OH$,  $Cl(CF_2CFCl)_mCF_2CH_2OH$ and $Cl(CF_2CFCl)_mCF_2CHFCF_2CH_2OH$ wherein $n$ is an integer of from 1 to 23 and $m$ is an integer of from 1 to 12, with from about 2 to about 2.5 moles of a thionyl halide in which the halogen has an atomic number of from 17 to 35 in the presence of from about 0.05 to about 0.5 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom, and $R''$ represents a member of the group consisting of hydrogen, an alkyl group of 1 to 8 carbon atoms, phenyl, halophenyl, and alkyl-substituted phenyl in which the alkyl groups contain 1 to 4 carbon atoms, at a temperature of from about 50° C. to about 200° C., and recovering the polyfluoroalkyl halide from the reaction mixture.

3. The process for preparing polyfluoroalkyl chlorides which comprises reacting one mole of a polyfluoroalcohol having a formula of the group consisting of $$C_nF_{2n+1}CF_2CH_2OH$$

$$\underset{\underset{CF_3}{|}}{CF_3CFCH_2OH}$$

$C_nF_{2n+1}CF_2CHFCF_2CH_2OH$, $H(CF_2)_nCF_2CH_2OH$, $Cl(CF_2)_nCF_2CH_2OH$, $Cl(CF_2CFCl)_mCF_2CH_2OH$ and $$Cl(CF_2CFCl)_mCF_2CHFCF_2CH_2OH$$

wherein $n$ is an integer of from 1 to 23 and $m$ is an integer of from 1 to 12, with from about 2 to about 2.5 moles of thionyl chloride in the presence of from about 0.05 to about 0.5 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom, and $R''$ represents a member of the group consisting of hydrogen, an alkyl group of 1 to 8 carbon atoms, phenyl, halophenyl, and alkyl-substituted phenyl in which the alkyl groups contain 1 to 4 carbon atoms, at a temperature of from about 50° C. to about 200° C., and recovering the polyfluoroalkyl chloride from the reaction mixture.

4. The process for preparing polyfluoroalkyl halides which comprises reacting one mole of a polyfluoroalcohol having a formula of the group consisting of $$C_nF_{2n+1}CF_2CH_2OH$$

$$\underset{\underset{CF_3}{|}}{CF_3CFCH_2OH}$$

$C_nF_{2n+1}CF_2CHFCF_2CH_2OH$, $H(CF_2)_nCF_2CH_2OH$ $Cl(CF_2)_nCF_2CH_2OH$, $Cl(CF_2CFCl)_mCF_2CH_2OH$ and $$Cl(CF_2CFCl)_mCF_2CHFCF_2CH_2OH$$

wherein $n$ is an integer of from 1 to 23 and $m$ is an integer of from 1 to 12, with from about 1.1 to about 2.5 moles of a thionyl halide in which the halogen has an atomic number of from 17 to 35 in the presence of from about 0.01 to about 1 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom, and $$-\overset{\overset{O}{\|}}{C}-R''$$

represents a saturated aliphatic acyl radical of 1 to 9 carbon atoms which consists of carbon, hydrogen and the single acyl oxygen atom, at a temperature of from about 50° C. to about 200° C., and recovering the polyfluoroalkyl halide from the reaction mixture.

5. The process for preparing polyfluoroalkyl halides which comprises reacting one mole of a polyfluoroalcohol having the formula $H(CF_2)_nCF_2CH_2OH$ wherein $n$ is an integer of from 1 to 23 with from about 1.1 to about 2.5 moles of a thionyl halide in which the halogen has an atomic number of from 17 to 35 in the presence of from about 0.01 to about 1 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom and $R''$ represents a member of the group consisting of hydrogen, an alkyl group of 1 to 8 carbon atoms, phenyl, halophenyl, and alkyl-substituted phenyl in which the alkyl groups contain 1 to 4 carbon atoms, at a temperature of from about 50° C. to about 200° C., and recovering the polyfluoroalkyl halide from the reaction mixture.

6. The process for preparing polyfluoroalkyl halides which comprises reacting one mole of a polyfluoroalcohol having the formula $H(CF_2)_nCF_2CH_2OH$ wherein $n$ is an integer of from 1 to 23 with from about 1.1 to about 2.5 moles of a thionyl halide in which the halogen has an atomic number of from 17 to 35 in the presence of about 0.01 to about 1 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom, and $$-\overset{\overset{O}{\|}}{C}-R''$$

represents a saturated aliphatic acyl radical of 1 to 8 carbon atoms which consists of carbon, hydrogen and the single acyl oxygen atom, at a temperature of from about 50° C. to about 200° C., and recovering the polyfluoroalkyl halide from the reaction mixture.

7. The process for preparing polyfluoroalkyl halides which comprises reacting one mole of a polyfluoroalcohol having the formula $H(CF_2)_nCF_2CH_2OH$ wherein $n$ is an integer of from 1 to 23 with from about 2 to about 2.5 moles of a thionyl halide in which the halogen has an atomic number of from 17 to 35 in the presence of from about 0.05 to about 0.5 mole of an amide of the formula $$R'_2N-\overset{\overset{O}{\|}}{C}-R''$$

wherein $R'_2N-$ represents the radical of a saturated secondary monoamine containing 2 to 16 carbon atoms and consisting of carbon, hydrogen and the single nitrogen atom, and $$-\overset{\overset{O}{\|}}{C}-R''$$

represents a saturate daliphatic acyl radical of 1 to 8 carbon atoms which consists of carbon, hydrogen and the single acyl oxygen atom, at a temperature of from about 50° C. to about 200° C., and recovering the polyfluoroalkyl halide from the reaction mixture.

8. The process for preparing polyfluoroalkyl halides which comprises reacting one mole of a polyfluoroalcohol having the formula $H(CF_2)_nCF_2CH_2OH$ wherein $n$ is an integer of from 1 to 8 with from about 2 to about 2.5 moles of a thionyl halide in which the halogen has an atomic number of from 17 to 35 in the presence of from about 0.05 to about 0.5 mole of an amide of the formula $$R'_2N-\overset{\overset{O}{\|}}{C}-R''$$

wherein R' represents an alkyl radical of 1 to 8 carbon atoms and

represents a saturated aliphatic acyl radical of 1 to 5 carbon atoms which consists of carbon, hydrogen and the single acyl oxygen atom, at a temperature of from about 50° C. to about 200° C., and recovering the polyfluoroalkyl halide from the reaction mixture.

9. The process for preparing polyfluoroalkyl chlorides which comprises reacting one mole of a polyfluoroalcohol having the formula $H(CF_2)_nCF_2CH_2OH$ wherein $n$ is an integer of from 1 to 8 with from about 2 to about 2.5 moles of thionyl chloride in the presence of from about 0.05 to about 0.5 mole of an amide of the formula

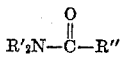

wherein R' represents an alkyl radical of 1 to 4 carbon atoms and

represents a saturated aliphatic acyl radical of 1 to 5 carbon atoms which consists of carbon, hydrogen and the single acyl oxygen atom, at a temperature of from about 50° C. to about 200° C., and recovering the polyfluoroalkyl chloride from the reaction mixture.

10. The process for preparing polyfluoroalkyl halides which comprises reacting one mole of a polyfluoroalcohol having the formula $H(CF_2)_nCF_2CH_2OH$ wherein $n$ is an integer of from 1 to 8 with from about 2 to about 2.5 moles of a thionyl halide in which the halogen has an atomic number of from 17 to 35 in the presence of from about 0.05 to about 0.5 mole of dimethylformamide, at a temperature of from about 50° C. to about 200° C., and recovering the polyfluoroalkyl halide from the reaction mixture.

11. The process for preparing polyfluoroalkyl chlorides which comprises reacting one mole of a polyfluoroalcohol having the formula $H(CF_2)_nCF_2CH_2OH$ wherein $n$ is an integer of from 1 to 8 with from about 2 to about 2.5 moles of thionyl chloride in the presence of from about 0.05 to about 0.5 mole of dimethylformamide, at a temperature of from about 50° C. to about 200° C., and recovering the polyfluoroalkyl chloride from the reaction mixture.

12. The process for preparing a polyfluoropropyl halide which comprises reacting one mole of 1H,1H,3H-perfluoro-1-propanol with about 1.1 to about 2.5 moles of a thionyl halide in which the halogen has an atomic number of from 17 to 35 in the presence of from about 0.01 to about 1 mole of an amide of the formula

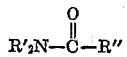

wherein R'$_2$N— represents the radical of a saturated secondary monoamine containing 2 to 16 carbon atoms and consisting of carbon, hydrogen and the single nitrogen atom, and

represents a saturated aliphatic acyl radical of 1 to 8 carbon atoms which consists of carbon, hydrogen and the single acyl oxygen atom, at a temperature of from about 50° C. to about 200° C., and recovering the polyfluoropropyl halide from the reaction mixture.

13. The process for preparing a polyfluoropropyl halide which comprises reacting one mole of 1H,1H,3H-perfluoro-1-propanol with from about 2 to about 2.5 moles of a thionyl halide in which the halogen has an atomic number of from 17 to 35 in the presence of from about 0.05 to about 0.5 mole of dimethylformamide, at a temperature of from about 50° C. to about 200° C., and recovering the polyfluoropropyl halide from the reaction mixture.

14. The process for preparing 1-chloro-1H,1H,3H-perfluoropropane which comprises reacting one mole of 1H,1H,3H-perfluoro-1-propanol with from about 2 to about 2.5 moles of thionyl chloride in the presence of from about 0.05 to about 0.5 mole of dimethylformamide, at a temperature of from about 50° C. to about 200° C., and recovering 1-chloro-1H,1H,3H-perfluoropropane from the reaction mixture.

15. The process for preparing 1-bromo-1H,1H,3H-perfluoropropane which comprises reacting one mole of 1H,1H,3H-perfluoro-1-propanol with from about 2 to about 2.5 moles of thionyl bromide in the presence of from about 0.05 to about 0.5 mole of dimethylformamide, at a temperature of from about 50° C. to about 200° C., and recovering 1-bromo-1H,1H,3H-perfluoropropane from the reaction mixture.

16. The process for preparing a polyfluoropropyl halide which comprises reacting one mole of 1H,1H-perfluoro-1-propanol with from about 2 to about 2.5 moles of a thionyl halide in which the halogen has an atomic number of from 17 to 35 in the presence of from about 0.05 to about 0.5 mole of dimethylformamide, at a temperature of from about 50° C. to about 200° C., and recovering the polyfluoropropyl halide from the reaction mixture.

17. The process for preparing 1-chloro-1H,1H-perfluoropropane which comprises reacting one mole of 1H,1H-perfluoro-1-propanol with from about 2 to about 2.5 moles of thionyl chloride in the presence of from about 0.05 to about 0.5 mole of dimethylformamide, at a temperature of from about 50° C. to about 200° C., and recovering 1-chloro-1H,1H-perfluoropropane from the reaction mixture.

18. The process for preparing 1-bromo-1H,1H-perfluoropropane which comprises reacting one mole of 1H,1H-perfluoro-1-propanol with from about 2 to about 2.5 moles of thionyl bromide in the presence of from about 0.05 to about 0.5 mole of dimethylformamide, at a temperature of from about 50° C. to about 200° C., and recovering 1-bromo-1H,1H-perfluoropropane from the reaction mixture.

No references cited.